US011176363B2

(12) United States Patent
Dorogoy et al.

(10) Patent No.: US 11,176,363 B2
(45) Date of Patent: Nov. 16, 2021

(54) SYSTEM AND METHOD OF TRAINING A CLASSIFIER FOR DETERMINING THE CATEGORY OF A DOCUMENT

(71) Applicant: AO Kaspersky Lab, Moscow (RU)

(72) Inventors: Dmitry S. Dorogoy, Moscow (RU); Alexander V. Sharov, Moscow (RU); Alexander A. Tuzovsky, Moscow (RU); Ilya A. Tereshchenko, Moscow (RU)

(73) Assignee: AO Kaspersky Lab, Moscow (RU)

( * ) Notice: Subject to any disclaimer, the term of this patent is extended or adjusted under 35 U.S.C. 154(b) by 832 days.

(21) Appl. No.: 15/958,431

(22) Filed: Apr. 20, 2018

(65) Prior Publication Data

US 2019/0102617 A1   Apr. 4, 2019

Related U.S. Application Data

(60) Provisional application No. 62/573,807, filed on Oct. 18, 2017.

(30) Foreign Application Priority Data

Sep. 29, 2017   (RU) .............................. RU2017133846

(51) Int. Cl.
  *G06K 9/00*   (2006.01)
  *G06K 9/62*   (2006.01)
(52) U.S. Cl.
  CPC ..... *G06K 9/00456* (2013.01); *G06K 9/00463* (2013.01); *G06K 9/00469* (2013.01);
  (Continued)

(58) Field of Classification Search
  CPC ........... G06K 9/00456; G06K 9/00463; G06K 9/00469; G06K 9/6212; G06K 9/6256; G06K 9/6267; G06K 9/6276
  See application file for complete search history.

(56) References Cited

U.S. PATENT DOCUMENTS

| 7,533,076 B2* | 5/2009 | Harris ................. G06K 9/6269 706/12 |
| 8,433,101 B2* | 4/2013 | Xu ....................... G06K 9/6296 382/107 |

(Continued)

FOREIGN PATENT DOCUMENTS

| DE | 102008041944 A1 | 3/2010 |
| WO | 2009061917 A1 | 5/2009 |
| WO | 2014018001 A1 | 1/2014 |

*Primary Examiner* — Peet Dhillon
(74) *Attorney, Agent, or Firm* — Arent Fox LLP; Michael Fainberg

(57) ABSTRACT

The present disclosure is directed to methods and systems for training a classifier for determining the category of a document. In an exemplary aspect, a method comprises obtaining one or more documents belonging to a first category as a training sample for a classifier, determining objects contained in each of the one or more documents, forming, by a hardware processor, a set of features consisting of the objects, constructing the classifier by selecting a classification model and training the classifier based on the set of features, obtaining additional documents belonging to the first category, calculating an error of classification of the additional documents using the classifier and when the error exceeds a given value, obtaining a second set of documents belonging to the first category or one or more new categories, otherwise, determining that the classifier is complete.

20 Claims, 8 Drawing Sheets

(52) U.S. Cl.
CPC ......... *G06K 9/6212* (2013.01); *G06K 9/6256* (2013.01); *G06K 9/6276* (2013.01)

(56) References Cited

U.S. PATENT DOCUMENTS

| | | | |
|---|---|---|---|
| 9,230,313 B2* | 1/2016 | Yamazaki | G06K 9/62 |
| 9,406,030 B2* | 8/2016 | Dolev | G06K 9/6276 |
| 9,547,807 B2* | 1/2017 | Vidal Calleja | G06K 9/6226 |
| 2002/0159641 A1* | 10/2002 | Whitney | G06K 9/6228 |
| | | | 382/219 |
| 2005/0266395 A1* | 12/2005 | Gholap | G06K 9/48 |
| | | | 435/4 |
| 2009/0116756 A1* | 5/2009 | Neogi | G06K 9/00442 |
| | | | 382/224 |
| 2010/0142832 A1 | 6/2010 | Nafarieh et al. | |
| 2012/0310864 A1 | 6/2012 | Chakraborty et al. | |
| 2014/0241622 A1 | 8/2014 | Abdo et al. | |
| 2014/0270536 A1* | 9/2014 | Amtrup | G06K 9/00483 |
| | | | 382/195 |
| 2016/0092730 A1 | 3/2016 | Smirnov et al. | |
| 2016/0307067 A1* | 10/2016 | Filimonova | G06K 9/00442 |
| 2017/0185859 A1* | 6/2017 | Nanaumi | G06K 9/00469 |
| 2017/0278015 A1 | 9/2017 | Miranda et al. | |

* cited by examiner

300

12 34 567890

US

Surname SMITH
Name JOHN
middle MICHAEL
Sex MALE   Date of birth 01.01.1980
Place of birth ALBANY NEW YORK, USA JOHN<<MICHAEL<<SMITH<<<<<<<<<<<<<<<<<<<<<<<<
1234567890US99999 <<<<<<<<<<<<<<<8888888888888<11

Fig. 3a

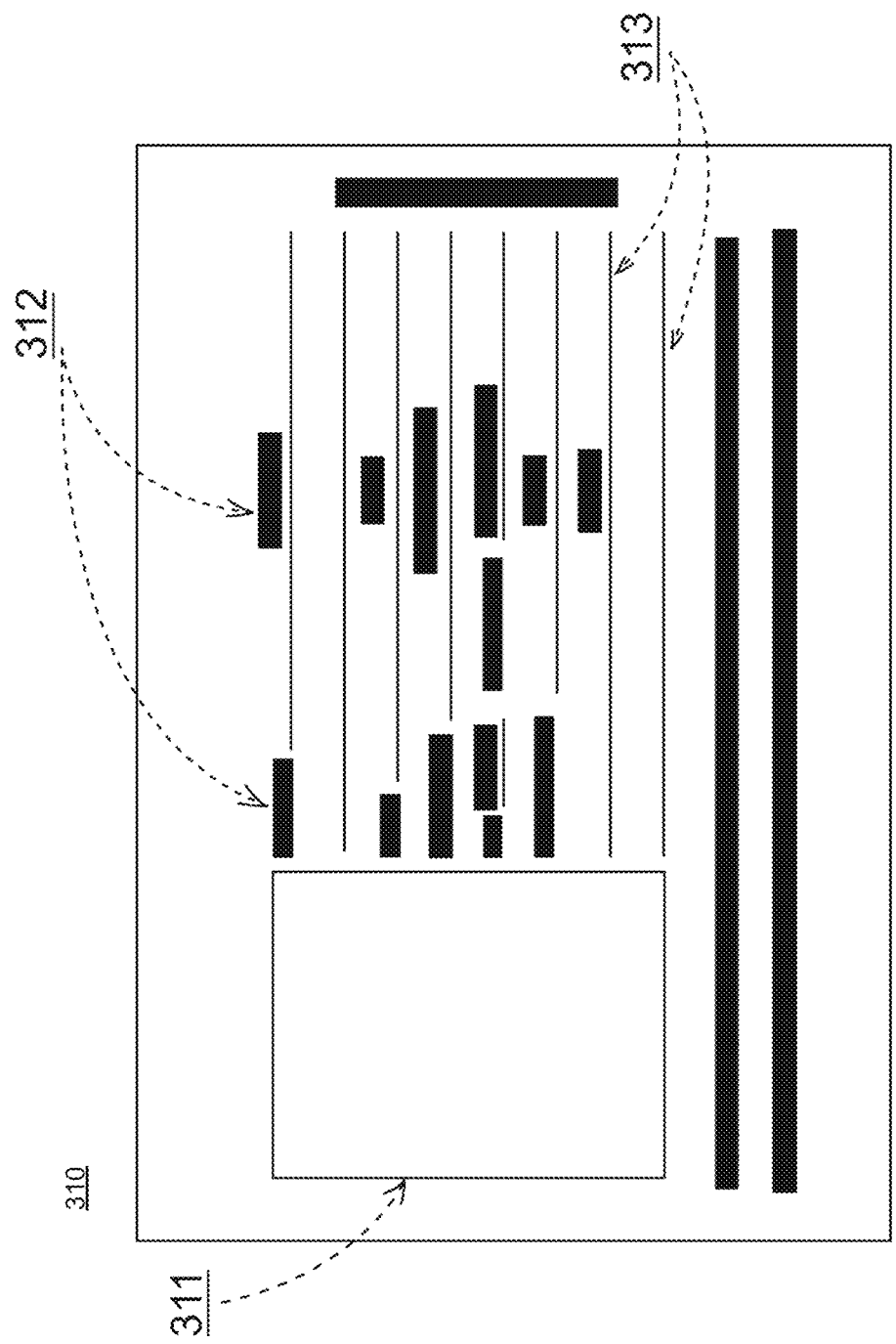

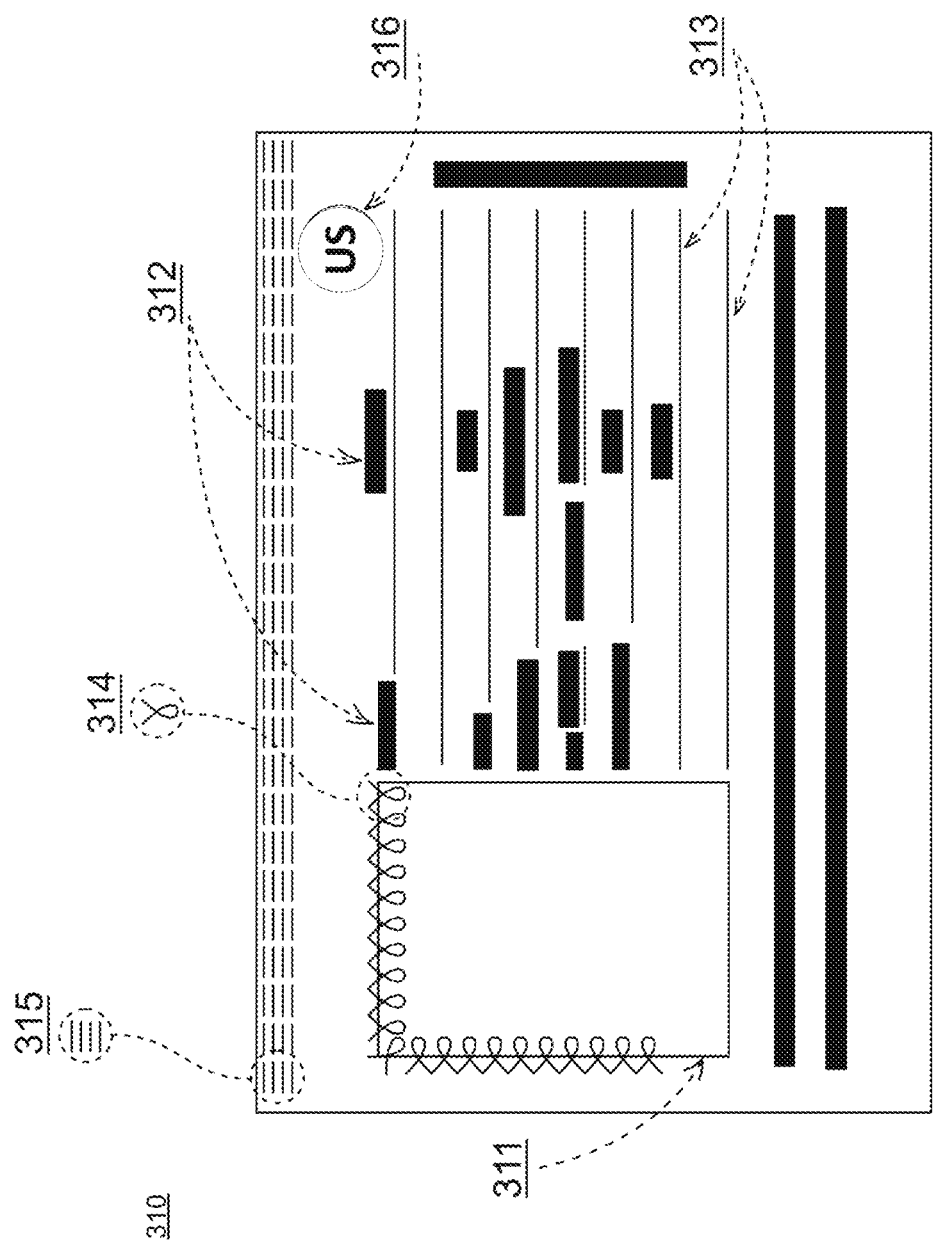

SYSTEM AND METHOD OF TRAINING A CLASSIFIER FOR DETERMINING THE CATEGORY OF A DOCUMENT

CROSS-REFERENCE TO RELATED APPLICATIONS

This application claims benefit of priority under 35 U.S.C. 119(a)-(d) to a Russian Patent Application No. 2017133846 filed on Sep. 29, 2017, and the benefit of priority under 35 U.S.C. 119(e) to U.S. Provisional Application No. 62/573,807 filed on Oct. 18, 2017, both of which are incorporated by reference in their entirety herein.

FIELD OF TECHNOLOGY

The disclosure pertains to the field of preventing leakage of information, and more particularly, towards a system and method of training a classifier for determining the category of a document.

BACKGROUND

In connection with the recent increase in cyber-attacks and the increasing volume of information theft, data leak prevention (DLP) systems are becoming increasingly in demand. One of the main tasks of DLP systems is to prevent leaks of electronic copies of personal and confidential documents, such as passports, birth certificates, driver's licenses, confidential agreements, and so forth.

Machine learning technologies have become widely used for the detection of personal and confidential documents, in particular machine learning technologies such as pattern recognition techniques, as well as optical character recognition (OCR) techniques. For these techniques, a set of similar documents of the categories of interest are put into a classifier, and on the basis of this set of documents, features are formulated and used to assign new documents to one of the categories afterwards.

However, the existing techniques often only demonstrate a good quality of classification for a given set of document categories. When a new category of documents is added, the training of the classifier has to be done once more on a large array of similar documents. Moreover, if a new document cannot be assigned to any category, it may still contain confidential data. Furthermore, in the construction of the majority of classifiers the tuning of the classifier by an analyst plays a major role, but often this does not result in a high quality of classification.

Thus, the technical problem arises of the difficulty of constructing a classifier ensuring a high quality of classification.

The known techniques do not solve the stated technical problem, for in a number of cases they do not afford a high quality of classification; in particular, they do not enable a classification of documents containing confidential data and not belonging to any of the known categories, and furthermore it is necessary to identify text contained in the document in order to determine the features in the aforementioned disclosure.

SUMMARY

Disclosed herein are methods and systems for training a classifier for determining the category of a document.

In one exemplary aspect, a method is provided for training a classifier, the method comprising obtaining one or more documents belonging to a first category as a training sample for a classifier, determining objects contained in each of the one or more documents, forming, by a hardware processor, a set of features consisting of the objects, constructing the classifier by selecting a classification model and training the classifier based on the set of features, obtaining additional documents belonging to the first category, calculating an error of classification of the additional documents using the classifier and when the error exceeds a given value, obtaining a second set of documents belonging to the first category or one or more new categories, otherwise, determining that the classifier is complete.

In another aspect, the method further comprises repeating the previous steps for each new category.

In another aspect, the error of classification comprises a probability of an incorrect classification of the one or more documents.

In another aspect, the objects comprise one or more of graphic and/or text elements.

In another aspect, the graphic elements comprise one or more of: an image of a person's face, frames of a photograph of a face, a seal and/or flag of a country, a stamp, a logotype, or the entire document.

In another aspect, the method further comprises performing preliminary processing on the one or more documents, the preliminary processing comprising one or more of decomposing a file into each of the one or more documents, and correcting distortions detected in the one or more documents.

In another aspect, the set of features comprise one or more of: presence of an object in each of the one or more documents, location of the object, quantity of the object, relationship between objects in a document, dimensions of the object, angle of inclination of the object, presence of a distortion of the object.

In another aspect, the set of features further comprise one or more of: a histogram of colors of an object, metadata of the object, a group of objects unified by a particular feature, a number of identical objects, conformity of the histogram of colors of an object to a specified pattern, conformity of a specified combination of objects to a pattern of mutual arrangement, a Fourier transform of the histogram of colors of an object, and type of distortions in the image of an object.

In one exemplary aspect, a system is provided for training a classifier for determining the category of a document comprises an analysis module configured to: obtain one or more documents belonging to a first category as a training sample for a classifier and determine objects contained in each of the one or more documents, a feature forming module configured to form a set of features consisting of the objects, a classifier construction module configured to construct the classifier by selecting a classification model and training the classifier based on the set of features; and wherein the analysis module is further configured to: obtain additional documents belonging to the first category, calculate an error of classification of the additional documents using the classifier, and when the error exceeds a given value, obtain a second set of documents belonging to the first category or one or more new categories, otherwise determine that the classifier is complete.

In one exemplary aspect, a non-transitory computer-readable medium stores thereon computer executable instructions that when executed perform a method for training a classifier for determining the category of a document, the method comprising: obtaining, by a hardware processor, one or more documents belonging to a first category as a training sample for a classifier, determining, by a hardware processor, objects contained in each of the one or more documents, forming, by a hardware processor, a set of features consisting of the objects, constructing, by a hardware processor, the classifier by selecting a classification model and training the classifier based on the set of features, obtaining additional documents belonging to the first category, calculating an error of classification of the additional documents using the classifier and when the error exceeds a given value, obtaining a second set of documents belonging to the first category or one or more new categories, otherwise, determining that the classifier is complete.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

FIG. 3a to FIG. 3c illustrate an example of a document and various examples of determination of the objects contained in the document in accordance with exemplary aspect of the present disclosure.

DETAILED DESCRIPTION

Exemplary aspects are described herein in the context of a system, method, and computer program product for training a classifier for determining the category of a document. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
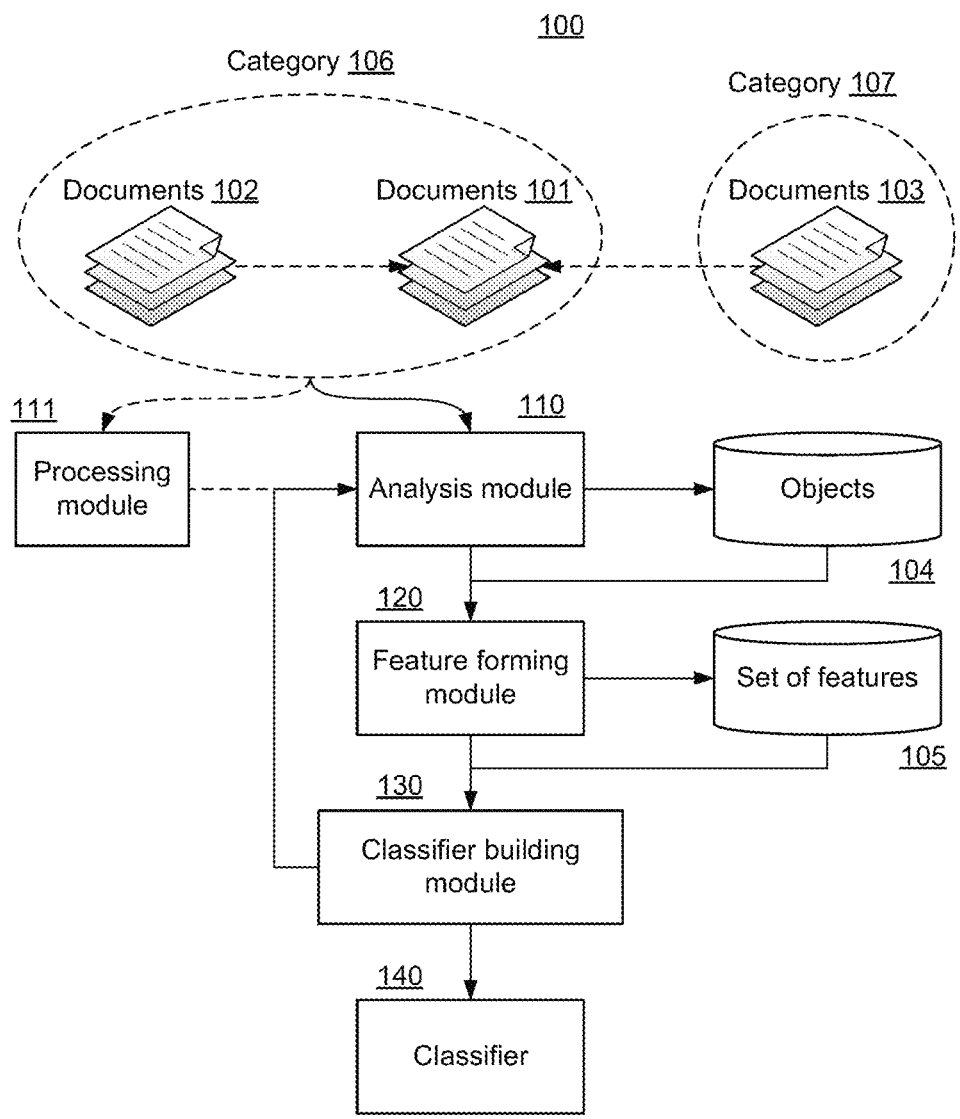
FIG. 1 illustrates a system for training a classifier for determining the category of a document in accordance with exemplary aspect of the present disclosure.

FIG. 1 illustrates a system 100 for training a classifier designed to determine the category of a document. An electronic document (hereafter, document) may refer to any computer file containing graphical and/or textual information. Such a file may have a graphic data format (JPEG, PNG, TIFF etc.) or an electronic document format (PDF, DOC, DOCX etc.). The present disclosure describes methods and systems to construct a classifier which determines the category of a document. In one exemplary aspect, documents which may potentially contain personal data, confidential data, or any other data representing value are considered. Certain documents may be assigned a category in advance, characterizing their belonging to existing paper documents (passport, driver's license, birth certificate, etc.). The category of a document may be assigned, for example, by an analyst, a user, or a computer system.

In one exemplary aspect, an analysis module 110 is used to obtain documents 101 which belong to a certain category 106. The documents 101 are used as a training sample to construct a classifier 140. The classifier 140 is a classification model for determining the category of any given document. The analysis module 110 may obtain a single document 101 in order to construct a classifier. However, the quality of the classification will be significantly improved if the training sample contains a sufficiently large number of documents 101. For each document 101 received, the analysis module 110 determines the objects 104 contained in it, being in particular graphic and/or text elements. In an exemplary aspect, the objects 104 may be, for example, one or more of the following: the image of a person's face, the frames of a photograph of a face, a seal or flag of a country, a stamp, a logotype or the entire document 101, if the format of the document 101 is graphic. In another exemplary aspect, the objects 104 may also be a composition of such objects as a segment, a point, a spline, an ellipse or other primitives if the format of the document 101 is graphic. In some exemplary aspects, the document 101 may contain combined graphic elements and text elements.

Thus, for example, documents of the "passport" category are characterized by the presence of objects 104 such as photographs, the image of a seal, text fields, such as "last name", "first name", "middle name", "date of birth", "place of birth", "issuance date", "issuing department", and so on. It should be noted that in one exemplary aspect the text objects may be recognized with the use of the OCR techniques by a processing module 111.

In another exemplary aspect, the text fields are not recognized as text, but as a region in which text is located. In this case, the text fields may be determined as separate rectangular graphic objects—this slightly lowers the quality of the classification, but at the same time significantly increases the working speed of the classifier, since the processing module 111 will not be performing the laborious task of text recognition.

In yet another exemplary aspect, a hybrid approach may be used—text is recognized in some of the text fields (such as the fields "last name", "first name", and so on), and not recognized in other text fields, and these text fields are determined as being rectangular objects. A rectangular object designating a specific last name will probably be situated opposite the field "last name". In this case, an additional feature selected may be the width of this rectangular object. The majority of English last names, for example, usually contain 3 to 8 letters. Therefore, the feature selected for this rectangular object may be a flag indicating whether or not the condition is fulfilled that the width of the object is in a range corresponding to 3-8 letters.

In one exemplary aspect, the system contains the processing module 111, which is needed for a preliminary processing of the documents 101. For example, the same graphics file may contain several documents 101. In this case, the processing module 111 will pick out (e.g., extract) all the documents contained in the graphics file and send the documents to the analysis module 110 for determination of the objects contained in the extracted documents.

In another example, the image of a document 101 may contain distortions or defects, such as distortion, rotation, altered perspective, glare or other defects, such as are natural when photographing or scanning a document. In one exemplary aspect, the processing module 111 may perform a correction of distortions with the use of methods known in the prior art before the documents 101 are sent for subsequent analysis by the analysis module 110. In this example, the processing module 111 may perform a correction of distortions in a new document 102 before the constructed classifier 140 determines the category of this new document 102 for which no category has been assigned (the classifier 140 will be described in more detail below). In another exemplary aspect, the processing module 111 will not perform a correction of distortions of the document 101. In this example, the processing module 111 also may not perform a correction of distortions in a new document 102 before determining its category by the constructed classifier 140.

In yet another exemplary aspect, the analysis module 110 initially receives pre-processed documents 101.

For each document 101 a feature forming module 120 forms a set of features 105, consisting of determined objects 104. The features are characteristics of the document 101. The features may be binary, nominal, serial or quantitative. In particular, the features may include one or more of the following:
the presence of an object;
the location of an object (such as coordinates);
the quantity of objects;
the disposition of one object in relation to another object (such as the distance between objects, the angle between the centers of objects, and so on);
the dimensions of an object (e.g., the area);
the angle of inclination of an object.

The numerical features of the indicated features may take on both absolute and relative values—with respect to the corresponding parameters of the entire document.

In a particular aspect, a feature may be the result of the working of a classification algorithm.

In another particular aspect, a feature may be the presence of a distortion of the image of an object, and also its type (distortion, rotation, altered perspective, presence of glare, etc.).

Moreover, when image distortion of an object is present, other features may be weakened. For example, glare in the image of the entire document may hide one or more objects, and consequently the presence of one or more such objects may be optional.

As a result, a classifier constructing module 130 will construct the classifier 140 on the basis of the values of the formulated features 105 for the documents 101 and, in particular, of a category 106 to which those documents 101 belong.

The constructed classifier 140 is then used to carry out the classification (i.e., to assign a category) of documents not previously assigned a category.

In one exemplary aspect, the analysis module 110 obtains additional documents 102-103, some of which belong to the category 106 (documents 102), and others to another category 107 (documents 103), and it calculates the error of classification of the additional documents with the use of the classifier 140. The error of classification might be, for example, the probability of an incorrect classification of the documents (for example, documents from category 107 have been classified as belonging to category 106, while documents from category 106 have been classified as not belonging to category 106). If the error of classification exceeds a given value (such as more than 5%), the construction of the classifier is repeated (i.e., the work of the analysis module 110, the feature forming module 120 and the classifier construction module 130 is repeated), except that the analysis module will obtain documents 101, 102 and 103, some of which belong to category 106 (documents 101 and 102), while others belong to category 107 (documents 103). Otherwise, if the classification error is less than or equal to a given value, the classifier construction module 130 finishes the construction of the classifier 140. In yet another exemplary aspect, besides the categories 106-107 there may be additional categories. In another particular exemplary aspect, the error of classification is calculated by using, in particular, one of the algorithms: minimization of empirical risk, cross validation.

In yet another exemplary aspect, additional documents are obtained belonging to each formulated category of the classifier, and the error of classification is calculated for those additional documents with the use of the mentioned classifier. If the error of classification exceeds a given value, the construction of the classifier is repeated taking into account the additional documents, otherwise the construction of the classifier is finished.

The classifier construction module 130 performs the construction of the classifier 140 by selecting a classification model (algorithm) and then training the classifier 140, where the formulated features serve as the feature description of the document and in particular one category of document serves as the classes.

In one exemplary aspect, one of the following classification models (algorithms) is selected:
Bayes classifier;
neural net;
Haar wavelet;
local binary patterns;
logistical regression;
histogram of directional gradients.

The training of the classifier 140 is done by using methods known in the prior art.

As an example, let us assume that the documents belong to the same category y (y=1, if the document belongs to this category, and y=0 otherwise). This category might be, for example, a passport or identify document, or any other category.

Let us assume that the classifier construction module 130 has chosen a model of logistical regression. In this case, the construction of the classifier 140 consists in building a probability model $P(y=1|x)=f(z)$, $z=\Theta^T x$, where x and $\Theta$ are the vectors of the values of the formulated features x and the regression parameters, and f(z) is a logistical function, $f(z)=1/(1+e^{-z})$.

For the selection of the parameters $\Theta$, the classifier construction module 130 uses the method of maximum likelihood, which involves finding those parameters $\Theta$ which maximize the likelihood function on the training sample (i.e., on the formulated set of features and the values taken on by these features for the documents 101 for which it is known that they belong to the indicated category).

As a result, by using the classifier 140 for an arbitrary new document not having a category assigned to it, one may determine whether or not it belongs to that category. For this, the objects contained in the new document will be determined, and then the values of the formulated features based on the objects will be determined. The probability $P(y=1|x)$ of whether the document belongs to a particular category will be calculated. If the calculated probability value is greater than 0.5, then it will be determined that the new document belongs to the indicated category. Otherwise, the new document will not be determined to belong to this category.

In one exemplary aspect, the choice of a particular classification model may be dictated by an analyst. In yet another particular exemplary aspect, the method of training the classifier (see FIG. 2) may be used for an identical set of documents for different models, and as a result there will be chosen a classifier 140 ensuring the least error of classification on the set of additional documents (test sample) for which the category is known.

In yet another exemplary aspect, the category of a document may also be a group of two or more categories, as well as a subcategory of a known category. For example, the category "passport" may have the following subcategories: "internal passport", "foreign passport", "diplomatic passport", and the passports of different countries in the world. These subcategories may themselves be categories in this exemplary aspect.

As a result, the stated technical problem will be solved and the stated technical result will be accomplished, consisting in better quality of determination of the category of a document by a classifier. Thus, for example, the document "residence permit" may be determined as belonging to the major category of "identity card", since it contains all the aforementioned features, even though it is neither a "passport", nor a "driver's license", nor has it been determined as belonging to either of these two categories.

In one exemplary aspect, the features additionally include the following:
- histogram of colors of an object;
- metadata of an object (such as the EXIF image file of a document);
- a group of objects unified by a particular feature;
- the number of identical objects;
- the conformity of the histogram of colors of an object to a specified pattern;
- the conformity of a specified combination of objects to a pattern of mutual arrangement;
- the Fourier transform of the histogram of colors of an object;
- the presence of distortions in the image of an object (both geometrical and optical);
- the type of distortions in the image of an object (such as distortion, rotation, altered perspective, presence of glare, etc.).

Figure 2:
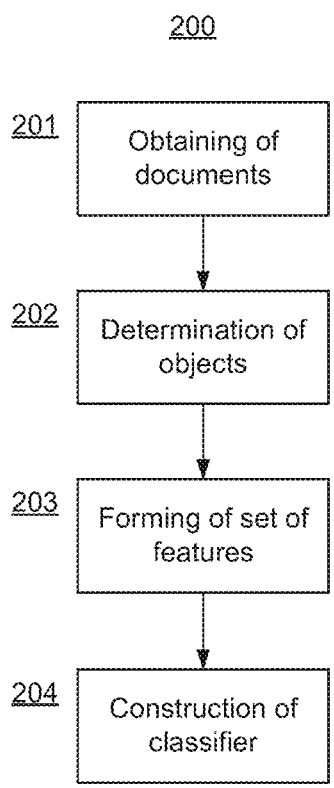
FIG. 2 is a flowchart for a method of training the classifier in accordance with exemplary aspect of the present disclosure.
Figure 5:
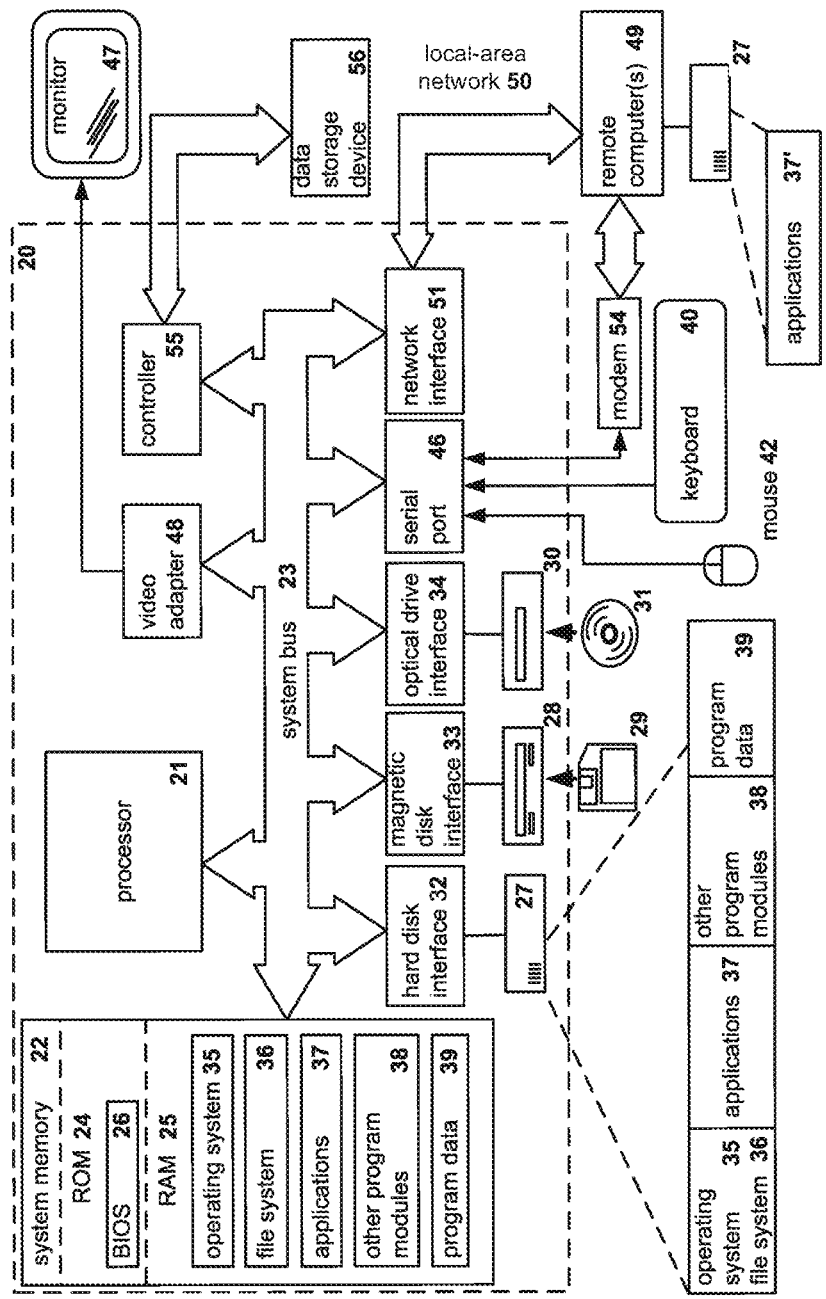
FIG. 5 illustrates an example of a general-purpose computer system in accordance with exemplary aspect of the present disclosure.

FIG. 2 illustrates a flowchart for a method 200 of training the classifier in accordance with an exemplary aspect of the present disclosure. The method 200 may be executed by a processor 21 of the system 20 as shown in FIG. 5.

The analysis module 110 in step 201 obtains the documents 101 which belong to the same category 106 and then, in step 202, for each document obtained it determines the objects contained in it. In step 203, for each document the feature forming module 120 forms a set of features consisting of the determined objects. As a result, in step 204 the classifier construction module 130 performs the construction of the classifier 140 on the basis of the features formed for the documents. Given the fact that a category may contain documents of different subcategories (such as a passport and a driver's license), the stated technical problem is solved and the technical result of better quality of determination of the category of a document by a classifier is achieved.

In one exemplary aspect, in step 204 the analysis module 110 obtains additional documents 102 belonging to the category 106 and calculates the error of classification of the additional documents with the use of the classifier 140. If the error of classification exceeds a given value, steps 201-204 will be repeated except that in step 201 documents will be obtained which belong to one of two (or more) categories—for example, category 106 and a new category 107, different from category 106. Otherwise, the construction of the classifier is finished. It should be noted that the proposed method will work analogously if there are more than two categories. In this case, the steps of the method 201-204 will be repeated a corresponding number of times.

FIG. 3a to FIG. 3c show an example of a document and various examples of determination of the objects contained in the document. FIG. 3a shows an US passport 300 (an illustrative example is shown, which is not intended to accurately depict an official government document). The analysis module 110 may determine the objects contained in the document 300, for example, those shown in FIG. 3b and FIG. 3c.

In the first example, in FIG. 3b, the objects may be, for example, a photograph 311, text fields 312 and a line segment 313. The characters contained in the text fields 312 or in some of the text fields 312 may be recognized with the use of OCR or not be recognized. In one exemplary aspect, the text fields 312 will be determined as rectangular areas in which the text of the document 310 is contained (document 300 with selected objects). In the present example, a total of 16 text fields 312, and also 9 line segments 313, have been selected.

The following features may be formulated, for example:
- presence of objects: photographs 311, text fields 312, line segments 313;
- locations of objects: coordinates of the objects 311-313 relative to the borders of the document 310;
- quantity of objects 311-313 (in the given example, one photograph 311, sixteen text fields 312 and nine line segments 313);
- mutual disposition of objects, for example, distance between line segments 313, distance and angle between line segments 313 and photograph 311, distance and angle between photograph 311 and text fields 312, and so forth;
- dimensions of an object, such as the ratio of the area of the photograph 311 to the area of the entire document 310, the ratio of the area of all text fields 312 to the area of the document 310, and so forth;
- angle of inclination of an object, for example, angle of inclination of the line segments 313 with respect to the borders of the document 310.

Yet another possible example of how the analysis module 110 may determine the objects contained in the document 310 is presented in FIG. 3c. Thus, in addition to the photograph 311, the text fields 312 and the line segments 313, there will be determined objects such as: patterns 314 and patterns 315, US inscription 316. Additional features in this example might be the following, for example:
- number of patterns 314 (total of 21), number of patterns 315 (total of 25);
- angle of inclination of patterns 314 with respect to borders of the document 320 (10 objects at an angle of 0 degrees, 1 at an angle of 45 degrees, 10 at an angle of 90 degrees);
- location of the US inscription 316 (upper right corner);

mutual disposition of patterns 314 (in the form of the rotated letter L at equal distance from each other) and patterns 315 (in the form of a horizontal line at equal distance from each other).

In yet another exemplary aspect, the characters in some or all of the text fields 312 may be recognized with the use of OCR. In this example, a feature for the presence of text fields may additionally be formed: last names, first names, middle names, sex, date of birth, place of birth. The feature of the presence of a number meeting the requirement for a passport number and other features may likewise be formed.

It should be noted that the two lower text fields are machine-readable text (for example, conforming to the standard Doc 9303—ICAO) and they may be quickly recognized with the use of the corresponding algorithms. In this case, the presence of machine-readable text may be an additional feature.

Oftentimes documents certifying identity, such as a passport 300, have a characteristic mesh background of a particular color. In this example, the predominant color in the histogram of colors of the entire document 300 may be chosen as an additional feature.

Figure 4A:
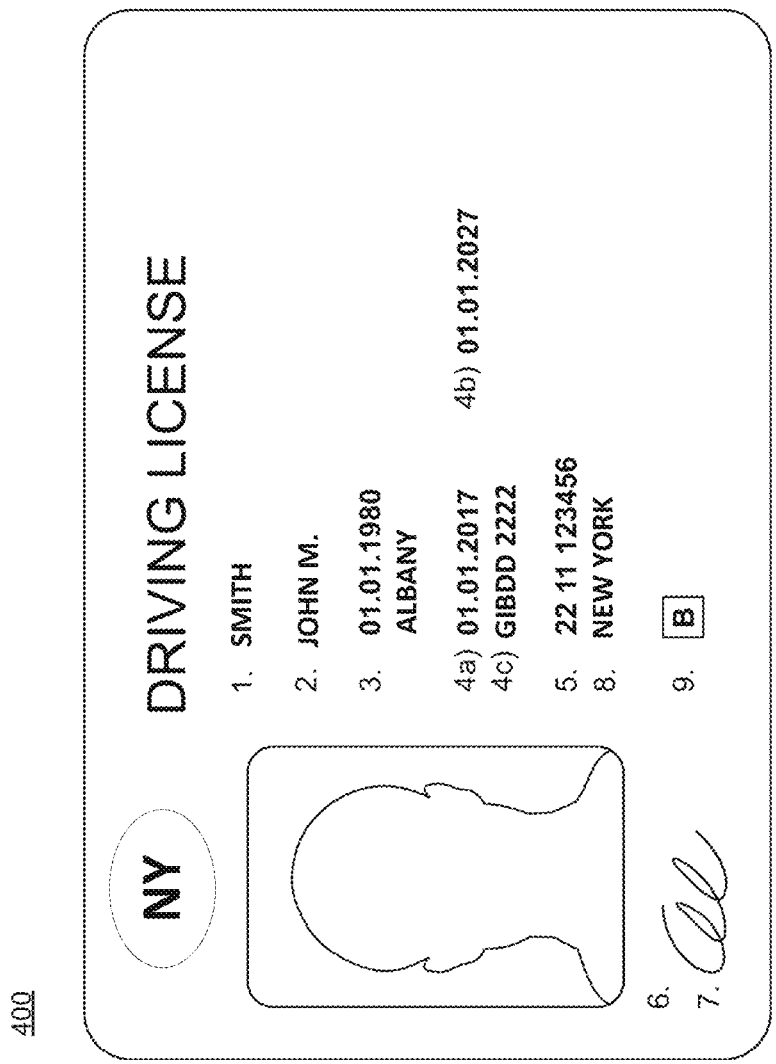
FIGS. 4a and 4b illustrate yet another example of a document and various examples of determination of the objects contained in the document in accordance with exemplary aspect of the present disclosure.
Figure 4B:
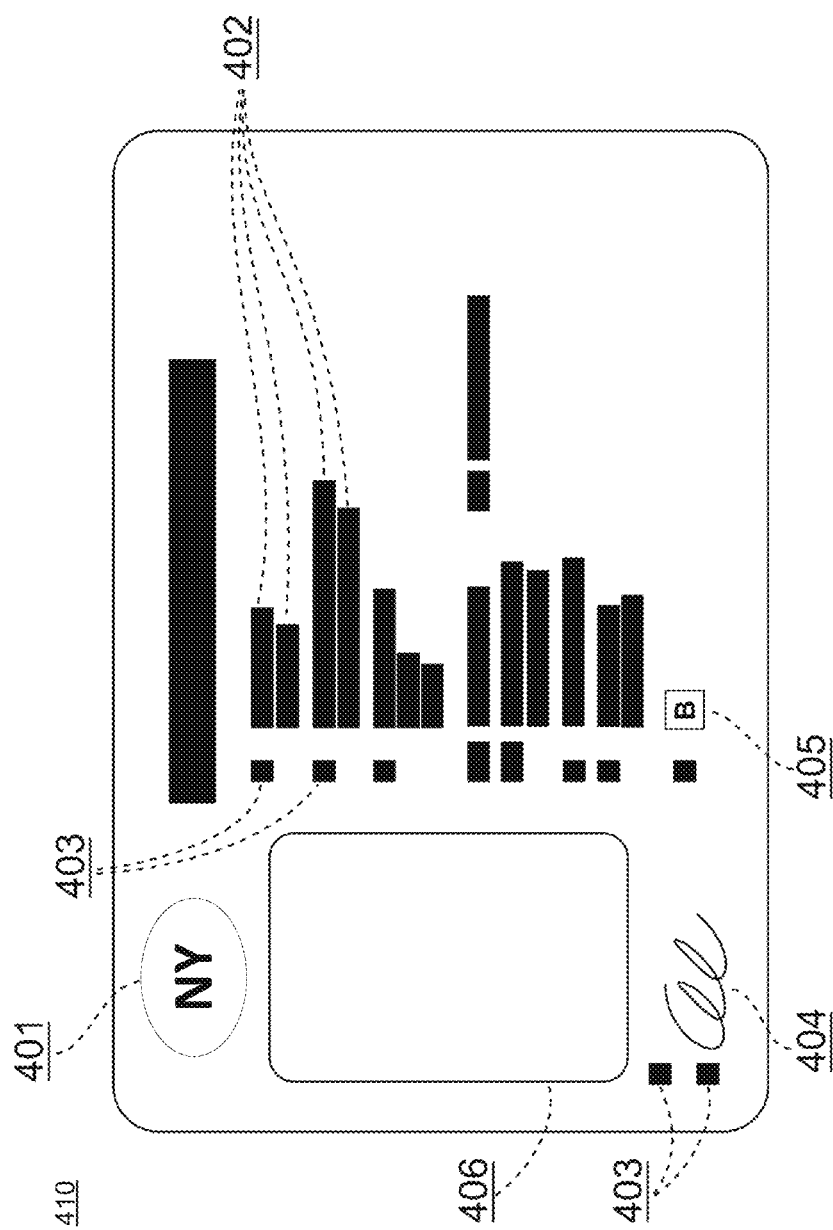

FIGS. 4*a* and 4*b* show yet another example of a document and various examples of determination of the objects contained in the document. FIG. 4*a* shows a New York driver's license 400. The analysis module 110 can determine the objects contained in the document 400, such as those presented in FIG. 4*b*.

In the example of FIG. 4*b* the objects might be, for example, a photograph 406, text fields 402, text fields 403, the state name (code) 401, the signature 404 and the category 405. The characters contained in the text fields 402-403 or in some of the text fields 402-403 may be recognized with the use of OCR or may not be recognized. In one exemplary aspect, the text fields 402-403 will be determined as rectangular areas in which text of the document 410 is contained (document 400 with selected objects). In the present example, a total of 11 text fields 403 and 14 text fields 402 were selected.

In one exemplary aspect, the following features may be formulated, for example:
  presence of objects: photograph 406, text fields 402-403, name of country 401, signature 404, category 405;
  locations of objects: photograph 406, text fields 402-403, name of country 401, signature 404, category 405;
  quantity of objects 401-406 (in the given example, one photograph 406, 11 text fields 403, 14 text fields 402, one signature 404, one category 405, one name of country 401);
  mutual disposition of objects, for example, distance and angle between photograph 406 and text fields 402, and so forth;
  dimensions of an object, such as the ratio of the area of the photograph 406 to the area of the entire document 410, the ratio of the area of all text fields 402-403 to the area of the document 410, and so forth;
  angle of inclination of an object, for example, angle of inclination of the text fields 402 with respect to the borders of the document 410.

In a particular exemplary aspect, the categories "passport" and "driver's license" may be combined into a single broad category "identity card". The aforementioned two categories contain many identical objects 104 (such as a photograph, a country name, text fields: last name, first name, middle name, date of birth) and a set of identical features may be formulated for them and thus, with the use of the proposed disclosure, a classifier 140 can be constructed which is able to determine the category of new documents not having been assigned a category.

Such features in the given example might be, for example, the presence of objects such as a photograph (311 for the passport and 406 for the driver's license), the country name (316 for the passport and 401 for the driver's license), and the presence of text fields such as last name, first name, middle name, date of birth (some of the fields 313 for the passport and some of the fields 402 for the driver's license).

Thus, with the use of the aforementioned features, there will be constructed a classifier determining the category "identity card" for both a passport 300 and a driver's license 400. Moreover, the constructed classifier will also determine other similar documents as belonging to the category "identity card", which have the identical values for the formulated set of features. Such documents will be, in particular, a residence permit, a foreign passport, a passport of other countries and other documents having present in them a photograph, a country name, and text fields (last name, first name, middle name, date of birth).

As a result, the stated technical problem will be solved and the stated technical result will be achieved, namely, better quality of determination of a category of a document by a classifier.

FIG. 5 is a diagram illustrating a general-purpose computer system on which aspects of systems and methods for training a classifier for determining the category of a document may be implemented in accordance with an exemplary aspect.

As shown, the computer system 20 (which may be a personal computer or a server) includes a central processing unit 21, a system memory 22 and a system bus 23 connecting the various system components, including the memory associated with the central processing unit 21. As will be appreciated by those of ordinary skill in the art, the system bus 23 may comprise a bus memory or bus memory controller, a peripheral bus, and a local bus that is able to interact with any other bus architecture. The system memory may include permanent memory (ROM) 24 and random-access memory (RAM) 25. The basic input/output system (BIOS) 26 may store the basic procedures for transfer of information between elements of the computer system 20, such as those at the time of loading the operating system with the use of the ROM 24.

The computer system 20, may also comprise a hard disk 27 for reading and writing data, a magnetic disk drive 28 for reading and writing on removable magnetic disks 29, and an optical drive 30 for reading and writing removable optical disks 31, such as CD-ROM, DVD-ROM and other optical media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the computer system 20.

The computer system 20 includes a hard disk 27, a removable magnetic disk 29 and a removable optical disk 31 connected to the system bus 23 via the controller 55. It will be understood by those of ordinary skill in the art that any type of media 56 that is able to store data in a form readable by a computer (solid state drives, flash memory cards, digital disks, random-access memory (RAM) and so on) may also be utilized.

The computer system 20 has a file system 36, in which the operating system 35, may be stored, as well as additional program applications 37, other program modules 38, and program data 39. A user of the computer system 20 may enter commands and information using keyboard 40, mouse 42, or any other input device known to those of ordinary skill in the art, such as, but not limited to, a microphone, joystick, game controller, scanner, etc. Such input devices typically plug into the computer system 20 through a serial port 46, which in turn is connected to the system bus, but those of ordinary skill in the art will appreciate that input devices may be also be connected in other ways, such as, without limitation, via a parallel port, a game port, or a universal serial bus (USB). A monitor 47 or other type of display device may also be connected to the system bus 23 across an interface, such as a video adapter 48. In addition to the monitor 47, the personal computer may be equipped with other peripheral output devices (not shown), such as loudspeakers, a printer, etc.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the computer system 20 may employ a modem 54 or other modules well known to those of ordinary skill in the art that enable communications with a wide-area computer network such as the Internet. The modem 54, which may be an internal or external device, may be connected to the system bus 23 by a serial port 46. It will be appreciated by those of ordinary skill in the art that said network connections are non-limiting examples of numerous well-understood ways of establishing a connection by one computer to another using communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure can be addressed in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a general purpose computer (such as the one described in greater detail in FIG. 3, supra). Accordingly, each module may be realized in a variety of suitable configurations, and should not be limited to any particular implementation exemplified herein.

In the interest of clarity, not all of the routine features of the aspects are disclosed It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the trainings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for training a classifier for determining a category of a document, comprising:
  obtaining, by a hardware processor, one or more documents belonging to a first category as a training sample for the classifier;
  determining, by a hardware processor, objects contained in each of the one or more documents;
  forming, by a hardware processor, a set of features consisting of the objects, and for object in the set of features, an indication of a presence of a distortion of the object,
  wherein, for each document, the set of features comprises at least relationships between at least two objects in the document, wherein the relationships between the at least two objects in the document includes at least a distance between objects and an angle between centers of the objects;
  constructing, by a hardware processor, the classifier by selecting a classification model and training the classifier based on the set of features;
  obtaining additional documents belonging to the first category;
  calculating an error of classification of the additional documents using the classifier;

when the error exceeds a given value, obtaining a second set of documents belonging to the first category for retraining the classifier; and when the error does not exceed the given value, determining that the classifier is complete.

2. The method of claim 1, further comprising:
repeating steps of claim 1 for each new category.

3. The method of claim 1, wherein the error of classification comprises a probability of an incorrect classification of the one or more documents.

4. The method of claim 1, wherein the objects comprise one or more of graphic and/or text elements.

5. The method of claim 4, wherein the one or more graphic and/or text elements comprise one or more of:
an image of a person's face, frames of a photograph of a face, a seal and/or flag of a country, a stamp, a logotype, or the entire document.

6. The method of claim 1, further comprising:
performing preliminary processing on the one or more documents, the preliminary processing comprising one or more of:
decomposing a file into each of the one or more documents; and
correcting distortions detected in the one or more documents.

7. The method of claim 1, wherein the set of features further comprises one or more of:
a location of the object, a quantity of the object, and dimensions of the object.

8. The method of claim 7, wherein the set of features further comprises one or more of:
a histogram of colors of the object, metadata of the object, a group of objects unified by a particular feature, a number of identical objects, conformity of the histogram of colors of an object to a specified pattern, conformity of a specified combination of objects to a pattern of mutual arrangement, a Fourier transform of the histogram of colors of the object, and type of distortions in the image of the object.

9. A system for training a classifier for determining a category of a document, comprising:
a processor configured to:
obtain one or more documents belonging to a first category as a training sample for the classifier; and
determine objects contained in each of the one or more documents;
form a set of features consisting of the objects, and for object in the set of features, an indication of a presence of a distortion of the object,
wherein, for each document, the set of features comprises at least relationships between at least two objects in the document, wherein the relationships between the at least two objects in the document includes at least a distance between objects and an angle between centers of the objects;
construct the classifier by selecting a classification model and training the classifier based on the set of features;
obtain additional documents belonging to the first category;
calculate an error of classification of the additional documents using the classifier;
when the error exceeds a given value, obtain a second set of documents belonging to the first category for retraining the classifier; and
when the error does not exceed the given value, determine that the classifier is complete.

10. The system of claim 9, wherein each module repeats configuration for each new category.

11. The system of claim 9, wherein the error of classification comprises a probability of an incorrect classification of the one or more documents.

12. The system of claim 9, wherein the objects comprise one or more of graphic and/or text elements.

13. The system of claim 12, wherein the one or more graphic and/or text elements comprise one or more of:
an image of a person's face, frames of a photograph of a face, a seal and/or flag of a country, a stamp, a logotype, or the entire document.

14. The system of claim 9, the processor further configured to:
perform preliminary processing on the one or more documents, the preliminary processing comprising one or more of:
decomposing a file into each of the one or more documents; and
correcting distortions detected in the one or more documents.

15. The system of claim 9, wherein the set of features further comprises one or more of:
a location of the object, a quantity of the object, and dimensions of the object.

16. The system of claim 15, wherein the set of features further comprises one or more of:
a histogram of colors of the object, metadata of the object, a group of objects unified by a particular feature, a number of identical objects, conformity of the histogram of colors of an object to a specified pattern, conformity of a specified combination of objects to a pattern of mutual arrangement, a Fourier transform of the histogram of colors of the object, and type of distortions in the image of the object.

17. A non-transitory computer-readable medium storing thereon computer executable instructions that when executed perform a method for training a classifier for determining a category of a document, the method comprising:
obtaining, by a hardware processor, one or more documents belonging to a first category as a training sample for the classifier;
determining, by a hardware processor, objects contained in each of the one or more documents;
forming, by a hardware processor, a set of features consisting of the objects, and for object in the set of features, an indication of a presence of a distortion of the object,
wherein, for each document, the set of features comprises at least relationships between at least two objects in the document, wherein the relationships between the at least two objects in the document includes at least a distance between objects and an angle between centers of the objects;
constructing, by a hardware processor, the classifier by selecting a classification model and training the classifier based on the set of features;
obtaining additional documents belonging to the first category;
calculating an error of classification of the additional documents using the classifier;
when the error exceeds a given value, obtaining a second set of documents belonging to the first category for retraining the classifier; and
when the error does not exceed the given value, determining that the classifier is complete.

18. The medium of claim 17, the instructions further comprising:

repeating steps of claim 17 for each new category.

19. The medium of claim 17, wherein the error of classification comprises a probability of an incorrect classification of the one or more documents.

20. The medium of claim 17, wherein the objects comprise one or more of graphic and/or text elements.

\* \* \* \* \*